(12) United States Patent  
Sasabayashi

(10) Patent No.: US 8,547,682 B2
(45) Date of Patent: Oct. 1, 2013

(54) MULTILAYER CERAMIC ELECTRONIC COMPONENT INCLUDING DIRECTLY PLATED EXTERNAL ELECTRODES

(75) Inventor: Takehisa Sasabayashi, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 337 days.

(21) Appl. No.: 12/765,965

(22) Filed: Apr. 23, 2010

(65) Prior Publication Data

US 2010/0271751 A1 Oct. 28, 2010

(30) Foreign Application Priority Data

Apr. 24, 2009 (JP) ................................. 2009-106615

(51) Int. Cl.
*H01G 4/228* (2006.01)
*H01G 4/06* (2006.01)

(52) U.S. Cl.
USPC ...................................... 361/306.3; 361/321.2

(58) Field of Classification Search
USPC ........................ 361/301.4, 321.2, 306.3, 308.1
See application file for complete search history.

(56) References Cited

U.S. PATENT DOCUMENTS

| | | | |
|---|---|---|---|
| 6,459,048 B1 | 10/2002 | Sakai et al. | |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,310,218 B2 * | 12/2007 | Togashi et al. | 361/306.3 |
| 7,344,981 B2 | 3/2008 | Ritter et al. | |
| 7,345,868 B2 | 3/2008 | Trinh | |
| 7,394,647 B2 * | 7/2008 | Togashi | 361/321.1 |
| 7,463,474 B2 | 12/2008 | Ritter et al. | |
| 7,551,422 B2 * | 6/2009 | Togashi | 361/309 |
| 8,064,187 B2 * | 11/2011 | Yoshida et al. | 361/301.4 |
| 2003/0206089 A1 | 11/2003 | Shikama et al. | |
| 2004/0022009 A1 * | 2/2004 | Galvagni et al. | 361/306.3 |
| 2005/0046536 A1 | 3/2005 | Ritter et al. | |
| 2006/0203420 A1 * | 9/2006 | Okuyama | 361/271 |
| 2006/0245141 A1 | 11/2006 | Shirasu et al. | |

(Continued)

FOREIGN PATENT DOCUMENTS

JP 09-050901 A 2/1997
JP 09190947 A * 7/1997

(Continued)

OTHER PUBLICATIONS

Kunishi et al., "Laminated Electronic Component and Method for Manufacturing the Same", U.S. Appl. No. 12/030,282, filed Feb. 13, 2008.

(Continued)

*Primary Examiner* — David M Sinclair
(74) *Attorney, Agent, or Firm* — Keating & Bennett, LLP

(57) ABSTRACT

In a multilayer ceramic electronic component including directly plated external electrodes, in an exposed area defined by exposed portions of a plurality of internal conductors, an area ratio of the exposed portions in an end section of the exposed area is smaller than an area of exposed portions in a center section of the exposed area.

4 Claims, 18 Drawing Sheets

(56) References Cited

U.S. PATENT DOCUMENTS

| | | |
|---|---|---|
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2010/0002356 A1 | 1/2010 | Yoshida et al. |

FOREIGN PATENT DOCUMENTS

| | | | |
|---|---|---|---|
| JP | 10012475 A | * | 1/1998 |
| JP | 11-067554 A | | 3/1999 |
| JP | 11297566 A | * | 10/1999 |
| JP | 2000124057 A | * | 4/2000 |
| JP | 2001-035746 A | | 2/2001 |
| JP | 2001-052937 A | | 2/2001 |
| JP | 2001-267118 A | | 9/2001 |
| JP | 2004-022859 A | | 1/2004 |
| JP | 2005216955 A | * | 8/2005 |
| JP | 2005-243944 A | | 9/2005 |
| JP | 2005-340663 A | | 12/2005 |
| JP | 2006-237078 A | | 9/2006 |
| JP | 2006-332601 A | | 12/2006 |
| JP | 2007-036003 A | | 2/2007 |
| JP | 2007-208112 A | | 8/2007 |
| JP | 2010-016071 A | | 1/2010 |
| WO | 2007/049456 A1 | | 5/2007 |

OTHER PUBLICATIONS

Kunishi et al., "Laminated Electronic Component and Method for Manufacturing the Same", U.S. Appl. No. 12/030,360, filed Feb. 13, 2008.

Tani, "Multilayer Electronic Component and Method for Manufacturing the Same", U.S Appl. No. 12/481,690, filed Jun. 10, 2009.

Ito et al., "Laminated Ceramic Electronic Component", U.S. Appl. No. 12/489,631, filed Jun. 23, 2009.

Kunishi et al., "Laminated Electronic Component and Method for Manufacturing the Same", U.S. Appl. No. 12/796,688, filed Jun. 9, 2010.

Official Communication issued in corresponding Japanese Patent Application No. 2009-106615, mailed on Feb. 19, 2013.

* cited by examiner

12

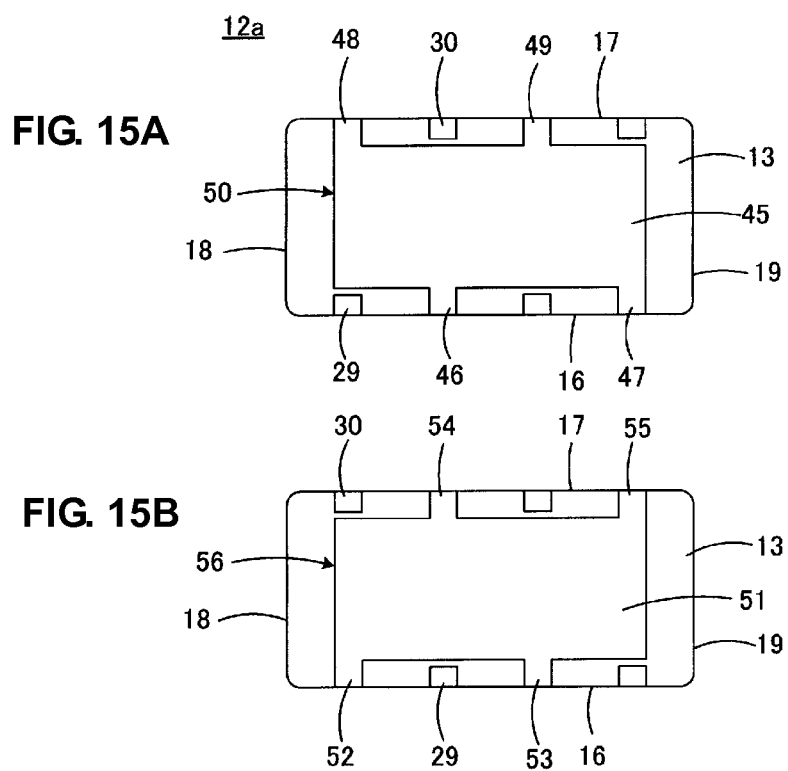

MULTILAYER CERAMIC ELECTRONIC COMPONENT INCLUDING DIRECTLY PLATED EXTERNAL ELECTRODES

BACKGROUND OF THE INVENTION

1. Field of the Invention

The present invention relates to multilayer ceramic electronic components, and particularly to a multilayer ceramic electronic component in which external terminal electrodes are formed by direct plating such that the external terminal electrodes are electrically connected to a plurality of internal conductors.

2. Description of the Related Art

In recent years, the market for small portable electronic devices, such as mobile phones, notebook computers, digital cameras, and digital audio devices, has been expanded. These portable electronic devices have been reduced in size and improved in performance. Accordingly, multilayer ceramic electronic components included, in large numbers, in such portable electrical devices are demanded to be smaller in size and higher in performance. For example, multilayer ceramic capacitors are demanded to be smaller in size and larger in capacitance.

An effective way to realize smaller-sized larger-capacitance multilayer ceramic capacitors is to reduce the thickness of dielectric ceramic layers. Recently, dielectric ceramic layers having a thickness of about 3 μm or less have been in practical use. Although there is currently a demand for thinner dielectric ceramic layers, use of thinner dielectric ceramic layers leads to easier occurrence of short circuits between internal electrodes. This makes it difficult to ensure quality of the multilayer ceramic capacitors.

Another effective way to realize smaller-sized larger-capacitance multilayer ceramic capacitors is to increase the effective area of internal electrodes. However, to produce multilayer ceramic capacitors in quantity, it is necessary to ensure, to some extent, a side margin between an internal electrode and a side surface of a ceramic body, and an end margin between an internal electrode and an end surface of the ceramic body. This means that there is a limit to increasing the effective area of the internal electrodes.

To increase the effective area of the internal electrodes while keeping predetermined margins, it is necessary to increase the area of dielectric ceramic layers. However, it is difficult to increase the area of the dielectric ceramic layers within specified dimensions. Additionally, the thickness of external terminal electrodes is an obstacle to increasing the area of the dielectric ceramic layers.

In the related art, external terminal electrodes of a multilayer ceramic capacitor are typically formed by applying conductive paste to end portions of a ceramic body and baking the applied paste. Generally, the conductive paste is applied by dipping the end portions of the ceramic body into a paste tank and raising the ceramic body from the paste tank. With this method, due to viscosity of the conductive paste, the coating of the conductive paste tends to be thicker at the centers of end surfaces of the ceramic body. Therefore, to compensate for the partially increased thickness (specifically, exceeding about 30 μm) of the external terminal electrodes, it is necessary to reduce the area of the dielectric ceramic layers.

As a solution to this, a method for forming external terminal electrodes by direct plating has been proposed (see, e.g., PCT International Patent Application Publication No. WO 2007/049456). In this method, a plating film is deposited and grows around exposed portions of internal electrodes in an end surface of a ceramic body, so that exposed portions of adjacent internal electrodes are connected to each other. As compared to the above method involving use of conductive paste, this method makes it possible to form a thinner, flatter electrode film.

Generally, ceramic electronic components, such as multilayer ceramic capacitors, have a rounded ceramic body to prevent cracking and chipping. For rounding, a polishing process, such as barrel polishing, is performed on the ceramic body. During the polishing process, pieces of constituent metal of the internal electrodes are scattered over the end surfaces of the ceramic body. Metal pieces tend to be scattered particularly near outer layers of the ceramic body, since the outer layer portions are removed to a greater degree.

If plating films grow around metal pieces scattered as described above, the external terminal electrodes formed by the plating films may be partially widened near the outer layers of the ceramic body. FIG. 18 illustrates a side surface 4 of a ceramic body 2 included in a multilayer ceramic electronic component 1. The side surface 4 has external terminal electrodes formed thereon. As illustrated in FIG. 18, the external terminal electrodes 3 may be partially widened near outer layers of the ceramic body 2.

Forming the external terminal electrodes 3 having the shape of FIG. 18 may lead to a problem called solder bridging, which creates an undesired connection between adjacent external terminal electrodes 3 during mounting.

SUMMARY OF THE INVENTION

Accordingly, preferred embodiments of the present invention provide a multilayer ceramic electronic component that can solve the problems described above.

According to a preferred embodiment of the present invention, a multilayer ceramic electronic component includes a ceramic body including a stack of ceramic layers, the ceramic body including two principal surfaces opposite each other and four side surfaces connecting the two principal surfaces, and rounded at corners and ridges between adjacent ones of the principal surfaces and side surfaces; a plurality of internal conductors disposed inside the ceramic body, the internal conductors each including an exposed portion exposed to at least one of the side surfaces; and a plurality of directly plated external terminal electrodes arranged on the side surfaces of the capacitor body such that the external terminal electrodes are electrically connected to the internal conductors. The exposed portions of the respective internal conductors are exposed adjacently in a stacking direction of the ceramic layers, and define an exposed area having an upper side of the uppermost exposed portion as an upper limit and a lower side of the lowermost exposed portion as a lower limit. To solve the technical problems described above, in the stacking direction of the ceramic layers, an area ratio of the exposed portions in an end section of the exposed area is made smaller than that of the exposed portions in a center section of the exposed area.

According to a preferred embodiment of the present invention, when a distance between the upper limit and the lower limit of the exposed area is denoted by D, each of sections that are within about 0.15 D from the respective principal surfaces may be defined as the end section of the exposed area and the remaining section may be defined as the center section of the exposed area.

According to another preferred embodiment of the present invention, the plurality of internal conductors may include center internal conductors disposed in a center of the ceramic body in the stacking direction of the ceramic layers, and including effective internal conductors substantially contributing to exhibited electrical characteristics; and end dummy internal conductors disposed at ends of the ceramic body in the stacking direction of the ceramic layers, not positioned at the same heights as those of the effective internal conductors, and substantially not contributing to exhibited electrical characteristics. The exposed portions of the respective center internal conductors may be exposed adjacently in the stacking direction of the ceramic layers, and a section having an upper side of the uppermost exposed portion as an upper limit and a lower side of the lowermost exposed portion as a lower limit may be defined as the center section of the exposed area. The exposed portions of the respective end dummy internal conductors may be exposed adjacently in the stacking direction of the ceramic layers, and each of sections having an upper side of the uppermost exposed portion as an upper limit and a lower side of the lowermost exposed portion as a lower limit may be defined as the end section of the exposed area.

As described above, to make the area ratio of the exposed portions in the end section of the exposed area smaller than that of the exposed portions in the center section of the exposed area, any of the following first to third preferred embodiments may be preferably carried out. In the first preferred embodiment, a width of the exposed portions of the internal conductors in the end section of the exposed area is preferably smaller than that of the exposed portions of the internal conductors in the center section of the exposed area. In the second preferred embodiment, a thickness of the exposed portion of each of the internal conductors in the end section of the exposed area is preferably smaller than that of the exposed portion of each of the internal conductors in the center section of the exposed area. In the third preferred embodiment, a distance between adjacent exposed portions of the internal conductors in the end section of the exposed area is preferably larger than that between adjacent exposed portions of the internal conductors in the center section of the exposed area.

Note that more than one of the first to third preferred embodiments described above may be combined.

In the exposed area defined by the exposed portions of the internal conductors, a relatively large amount of constituent metal of the internal conductors is scattered in the end section of the exposed area during a polishing process. According to preferred embodiments of the present invention, the area ratio of the exposed portions in the end section of the exposed area is preferably smaller than that of the exposed portions in the center section of the exposed area. With this configuration, the amount of metal scattered in the end section of the exposed area can be relatively reduced. Ideally, with this configuration, the amount of scattered metal can be made substantially uniform in the stacking direction of the ceramic body.

Therefore, even when plating films grow around pieces of metal scattered in the polishing process, the external terminal electrodes formed by the plating films can be prevented from being partially widened near outer layers of the ceramic body. Thus, even when the external terminal electrodes are formed side by side on one side surface of the ceramic body, it is possible to prevent easy occurrence of solder bridging, which creates an undesired connection between adjacent external terminal electrodes during mounting.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 15A and FIG. 15B are diagrams illustrating an eighth preferred embodiment of the present invention, the diagrams corresponding to some of FIG. 3A to FIG. 3F.

DESCRIPTION OF THE PREFERRED EMBODIMENTS

Figure 1:
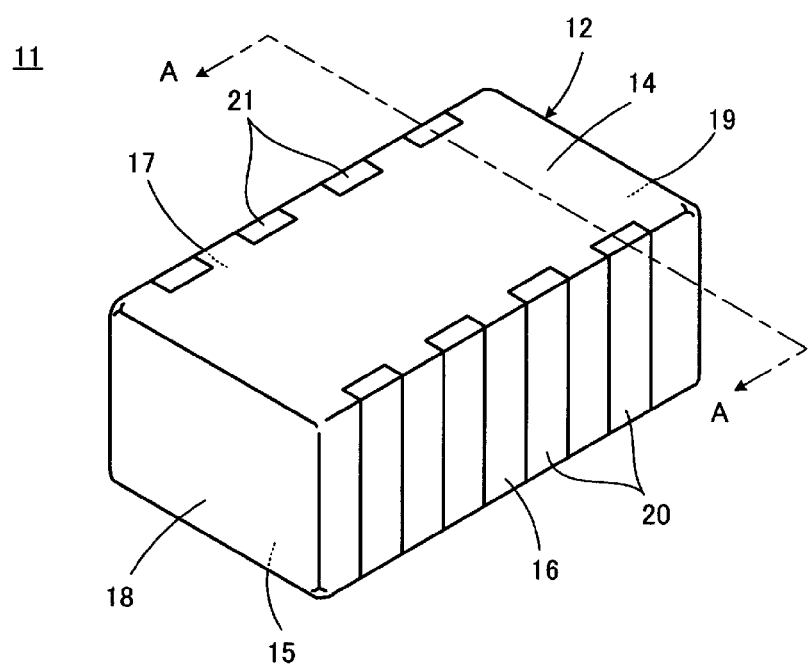
FIG. 1 is an external perspective view of a multilayer ceramic electronic component according to a first preferred embodiment of the present invention.
Figure 2:
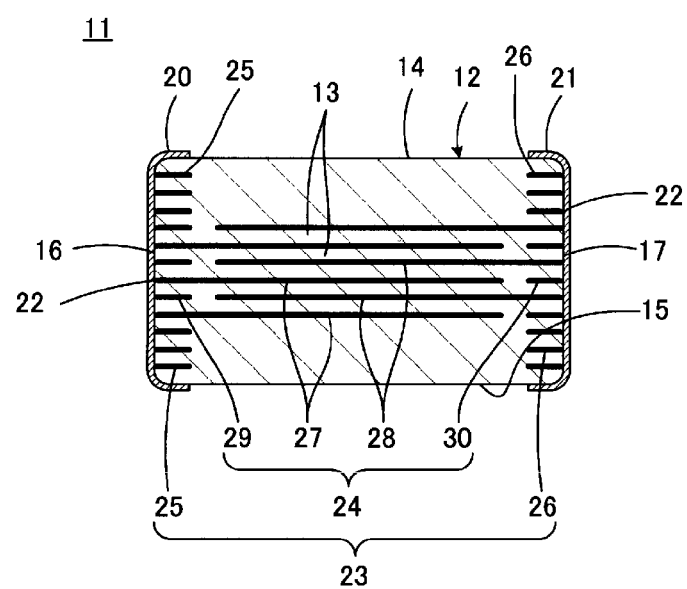
FIG. 2 is a cross-sectional view taken along line A-A of FIG. 1.
Figure 3:
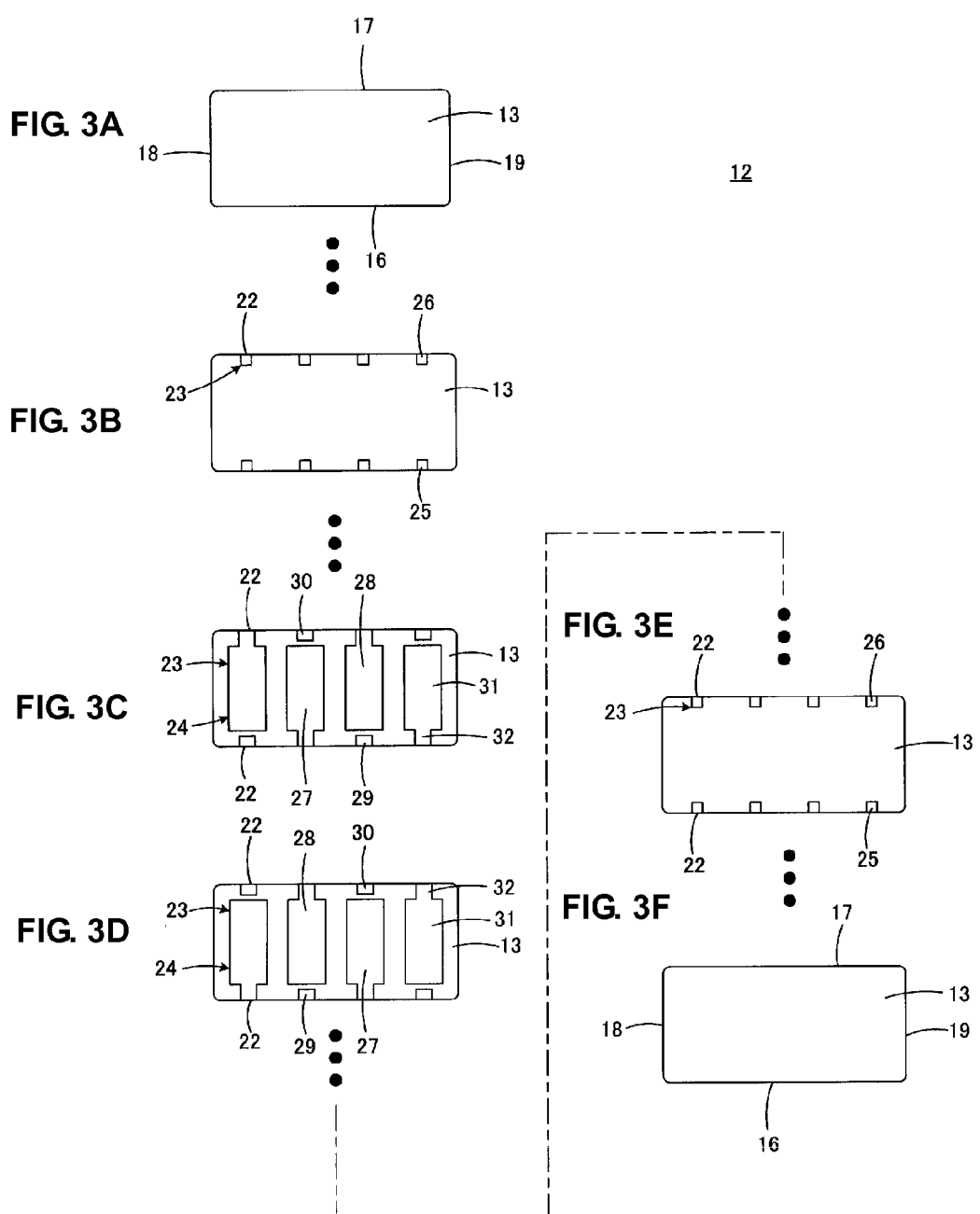
FIGS. 3A to FIG. 3F are plan views illustrating an internal configuration of a ceramic body included in the multilayer ceramic electronic component illustrated in FIG. 1, the ceramic body having a plurality of ceramic layers stacked in order from FIG. 3A to FIG. 3F.

A multilayer ceramic electronic component 11 according to a first preferred embodiment of the present invention will be described with reference to FIG. 1 to FIG. 7.

As illustrated in FIGS. 1 to FIG. 3F, a ceramic body 12 of the multilayer ceramic electronic component 11 includes a plurality of stacked ceramic layers 13. The ceramic body 12 has a first principal surface 14 and a second principal surface 15 opposite each other, and first to fourth side surfaces 16 to 19 that connect the first and second principal surfaces 14 and 15. The first side surface 16 and the second side surface 17 are opposite each other, and the third side surface 18 and the fourth side surface 19 are opposite each other.

As can be seen from FIGS. 1 to FIG. 4 and FIG. 7, corners and ridges between adjacent ones of the principal surfaces 14 and 15 and side surfaces 16 to 19 of the ceramic body 2 are rounded.

As clearly illustrated in FIG. 1, the multilayer ceramic electronic component 11 is an array type component having a plurality of elements. A plurality of first external terminal electrodes 20 are disposed on the first side surface 16, and a plurality of second external terminal electrodes 21 are disposed on the second side surface 17. The first external terminal electrodes 20 are electrically insulated from the second external terminal electrodes 21. At the same time, the first external terminal electrodes 20 are electrically insulated from each other, and the second external terminal electrodes 21 are also electrically insulated from each other.

As illustrated in FIGS. 2 and FIG. 3A to FIG. 3F, the ceramic body 12 is internally provided with a plurality of internal conductors 23 each having an exposed portion 22 exposed to at least one of the side surfaces 16 to 19. In the present preferred embodiment, the internal conductors 23 include center internal conductors 24 and end internal conductors 25 and 26. The center internal conductors 24 are disposed in a center of the ceramic body 12 in the stacking direction of the ceramic layers 13. The end internal conductors 25 and 26 are disposed at ends of the ceramic body 12 in the stacking direction of the ceramic layers 13.

The internal conductors 23 including the center internal conductors 24 and the end internal conductors 25 and 26 are electrically connected to one of the first and second external terminal electrodes 20 and 21 described above. In the following description, if it is necessary to make a distinction between conductors connected to the first external terminal electrodes 20 and those connected to the second external terminal electrodes 21, those connected to the first external terminal electrodes 20 are referred to with the word "first" and those connected to the second external terminal electrodes 21 are referred to with the word "second".

The center internal conductors 24 include first effective internal conductors 27 and second effective internal conductors 28 substantially contributing to exhibited electrical characteristics, and first center dummy internal conductors 29 and second center dummy internal conductors 30 substantially not contributing to exhibited electrical characteristics. The first center dummy internal conductors 29 are positioned at the same heights as those of the respective second effective internal conductors 28, and the second center dummy internal conductors 30 are positioned at the same heights as those of the respective first effective internal conductors 27.

The end internal conductors 25 and 26 are not positioned at the same heights as those of the effective internal conductors 27 and 28, and substantially do not contribute to exhibited electrical characteristics. Therefore, the end internal conductors 25 and 26 will hereinafter be referred to as "end dummy internal conductors". The end dummy internal conductors 25 and the end dummy internal conductors 26 may be referred to as "first end dummy internal conductors" and "second end dummy internal conductors", respectively, in relation to the first and second external terminal electrodes 20 and 21 described above.

Of the end dummy internal conductors 25 and 26, for example, those closest to the effective internal conductors 27 or 28 may exhibit electrical characteristics slightly in the form of stray capacitance or the like relative to the effective internal conductors 27 or 28. However, this is not included in the definition of "substantially contributing to exhibited electrical characteristics". Also, the center dummy internal conductors 29 and 30 may exhibit electrical characteristics slightly in the form of stray capacitance or the like relative to, for example, the effective internal conductors 27 or 28 positioned at the same heights as those of the center dummy internal conductors 29 and 30. However, again, this is not included in the definition of "substantially contributing to exhibited electrical characteristics".

When the external terminal electrodes 20 and 21 are formed by plating, the end dummy internal conductors 25 and 26 and the center dummy internal conductors 29 and 30 function to allow each of the exposed portions 22 to act as a core for deposition of plating metal, and thus contribute to improved fixing strength of the external terminal electrodes 20 and 21. In particular, the end dummy internal conductors 25 and 26 contribute to improved strength of the multilayer ceramic electronic component 11.

The dummy internal conductors 25, 26, 29, and 30 may not be provided depending on the design of an effective region where electrical characteristics are exhibited.

In the multilayer ceramic electronic component 11, as a material of the ceramic layers 13, dielectric ceramic having $BaTiO_3$, $CaTiO_3$, $SrTiO_3$, $CaZrO_3$, or other suitable materials as a main component can be used, for example. Alternatively, a material obtained by adding an accessory component, such as an Mn compound, an Fe compound, a Cr compound, a Co compound, or an Ni compound, to the above-described main component may be used, for example. Other materials that can be used include a piezoelectric ceramic, such as PZT-based ceramic; a semiconductor ceramic, such as spinel-based ceramic; and a magnetic ceramic, such as ferrite, for example.

The multilayer ceramic electronic component 11 functions as a capacitor when a dielectric ceramic is used as a material of the ceramic layers 13, functions as a piezoelectric component when a piezoelectric ceramic is used as a material of the ceramic layers 13, functions as a thermistor when a semiconductor ceramic is used as a material of the ceramic layers 13, and functions as a coil component when a magnetic ceramic is used as a material of the ceramic layers 13. The thickness of each of the ceramic layers 13 after baking is preferably from about 0.5 μm to 10 μm, for example.

When the multilayer ceramic electronic component 11 is, for example, a capacitor, a piezoelectric component, or a thermistor, the effective internal conductors 27 and 28 each have a facing portion 31 and an extended portion 32, as illustrated in FIG. 3C and FIG. 3D. The extended portion 32 is extended from the facing portion 31 to the side surface 16 or 17. The facing portions 31 of the effective internal conductors 27 and 28 face each other with one of the ceramic layers 13 interposed therebetween. Thus, predetermined electrical characteristics are exhibited.

When a multilayer ceramic electronic component according to a preferred embodiment of the present invention is a coil component, such as an inductor, effective internal conductors each include a coil conductor having a predetermined pattern and a via conductor for providing a spatial connection between coil conductors, so that a coil is formed inside a ceramic body.

Figure 4:
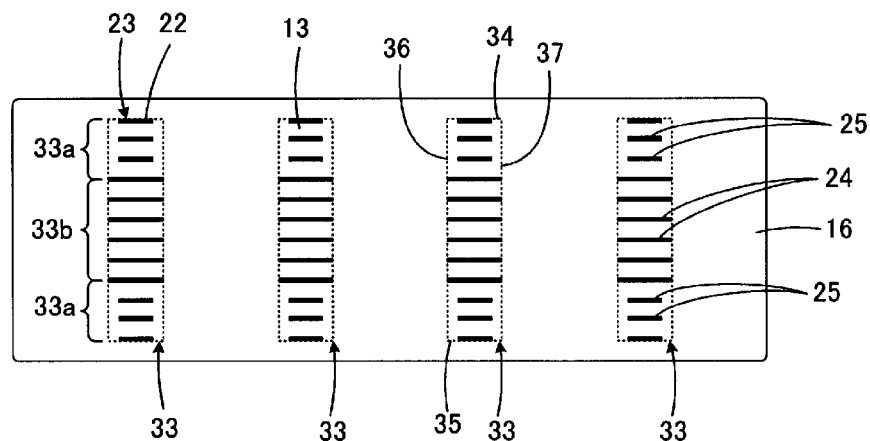
FIG. 4 is a diagram illustrating a side surface of the ceramic body included in the multilayer ceramic electronic component of FIG. 1, the ceramic body being in a state before formation of external terminal electrodes, the diagram illustrating exposed areas each being formed by exposed portions of a plurality of internal conductors.

FIG. 4 illustrates a configuration of the ceramic body as viewed from the side surface 16. As illustrated, the exposed portions 22 of the internal conductors 23 are exposed to the side surface 16 adjacently in the stacking direction of the ceramic layers 13. The exposed portions 22 form an exposed area 33 having an upper side of the uppermost exposed portion 22 as an upper limit 34 and a lower side of the lowermost exposed portion 22 as a lower limit 35.

Like FIG. 4, FIGS. 5 to FIG. 13B each illustrate a configuration of the ceramic body 12 as viewed from the side surface 16. Therefore, a configuration on the side surface 16 will be described with reference to each of FIGS. 5 to FIG. 13B. A configuration on the side surface 17 opposite the side surface 16 is substantially the same as that of the side surface 16, and thus will not be described here.

For convenience, the exposed area 33 is defined such that it ultimately becomes rectangular in shape, for example. This makes it easier to determine area ratios through image processing.

For example, the upper limit 34 is defined by a straight line passing through a midpoint of the upper side of the uppermost exposed portion 22, and the lower limit 35 is defined by a straight line passing through a midpoint of the lower side of the lowermost exposed portion 22. Note that these straight lines are parallel or substantially parallel to each other.

A left limit 36 and a right limit 37 are defined, for example, by two parallel or substantially parallel straight lines passing through respective coordinate positions that are obtained by averaging coordinates of left endpoints of relatively wide exposed portions 22 and averaging coordinates of right endpoints of the relatively wide exposed portions 22. These two straight lines are perpendicular or substantially perpendicular to the above-described straight lines that define the upper limit 34 and the lower limit 35.

The left limit 36 and the right limit 37 will be more specifically described. In the present preferred embodiment, as illustrated in FIG. 4, when the exposed portions 22 of the center internal conductors 24 are relatively wide and the exposed portions 22 of the end dummy internal conductors 25 are relatively narrow, the left and right limits of the center internal conductors 24 are used as a reference to determine the left limit 36 and the right limit 37. For example, to determine the left limit 36, coordinate positions of the left endpoints of the center internal conductors 24 are taken to determine the average position. A straight line that passes through this average position is thus determined to be the left limit 36. If the center internal conductors 24 are provided in large numbers, average coordinates of the left and right endpoints of only three exposed portions 22, the uppermost, middle, and lowermost exposed portions 22, of the center internal conductors 24 may be obtained to determine the left limit 36 and the right limit 37.

Figure 5:
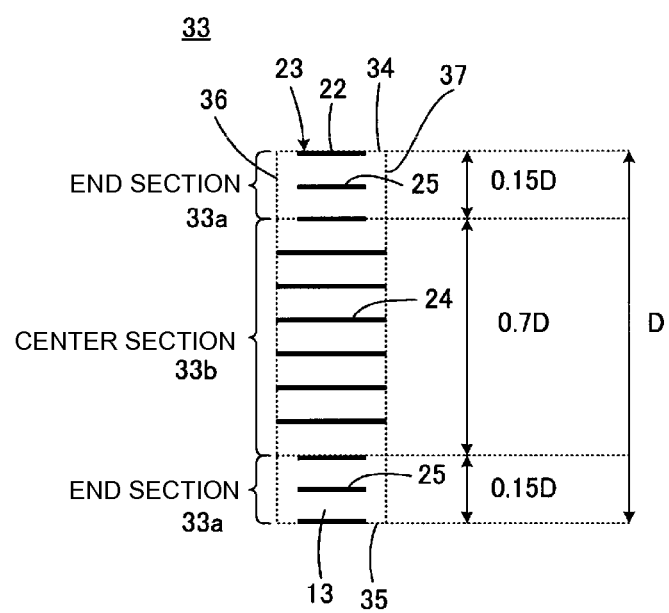
FIG. 5 illustrates a first method for defining end sections and a center section of each of the exposed areas illustrated in FIG. 4.

A method for defining end sections and a center section of the exposed area 33 will be described. As illustrated in FIG. 5, when the distance between the upper limit 34 and the lower limit 35 of the exposed area 33 is denoted by D, sections that are within about 0.15 D from the respective principal surfaces 14 and 15 (see FIG. 1) are defined as exposed area end sections 33a, and the remaining section of the exposed area 33 is defined as an exposed area center section 33b. The value "0.15" used here is determined empirically on the basis of how internal conductors are scattered in the polishing process.

When the exposed area end sections 33a and the exposed area center section 33b are defined by the method described above, some of the exposed portions 22 included in the exposed area end sections 33a may be provided by the exposed portions 22 of the center internal conductors 24, and some of the exposed portions included in the exposed area center section 33b may be provided by the exposed portions 22 of the end dummy internal conductors 25 or 26.

Figure 6:
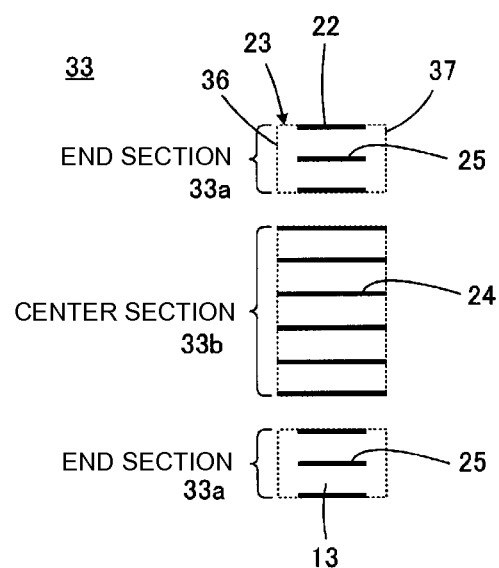
FIG. 6 illustrates a second method for defining end sections and a center section of each of the exposed areas illustrated in FIG. 4.

Another method for defining the exposed area end sections 33a and the exposed area center section 33b will be described. As illustrated in FIG. 6, a section where the exposed portions 22 of the center internal conductors 24 are exposed adjacently in the stacking direction of the ceramic layers 13, the section having an upper side of the uppermost exposed portion 22 as an upper limit and a lower side of the lowermost exposed portion 22 as a lower limit, is defined as the exposed area center section 33b. On the other hand, a section where the exposed portions 22 of the first end dummy internal conductors 25 are exposed adjacently in the stacking direction of the ceramic layers 13, the section having an upper side of the uppermost exposed portion 22 as an upper limit and a lower side of the lowermost exposed portion 22 as a lower limit, is defined as the exposed area end section 33a.

For convenience, each limit of the exposed area center section 33b and the exposed area end sections 33a can be defined in accordance with the above-described method for defining the limits of the exposed area 33. As for the left and right limits 36 and 37 of the exposed area center section 33b and the exposed area end sections 33a, straight lines that pass along an exposed area where the exposed portions 22 are wide can be defined as the left and right limits 36 and 37.

In the exposed area 33 described above, in the stacking direction of the ceramic layers 13, the area ratio of the exposed portions 22 in the exposed area end section 33a is smaller than that of the exposed portions 22 in the exposed area center section 33b. In the present preferred embodiment in particular, the width of the exposed portions 22 in the exposed area end sections 33a is smaller than that of the exposed portions 22 in the exposed area center section 33b.

The internal conductors 23 may contain a conductive material, such as Ni, Cu, Ag, Pd, Ag—Pd alloy, or Au, for example. The thickness of each internal conductor 23 is preferably from about 0.3 µm to about 2.0 µm, for example.

The external terminal electrodes 20 and 21 are formed by direct plating such that they are electrically connected to the internal conductors 23. In other words, the external terminal electrodes 20 and 21 are formed by plating such that at least their base layers are in contact with the ceramic body 12 and the exposed portions 22 of the internal conductors 23.

Figure 7:
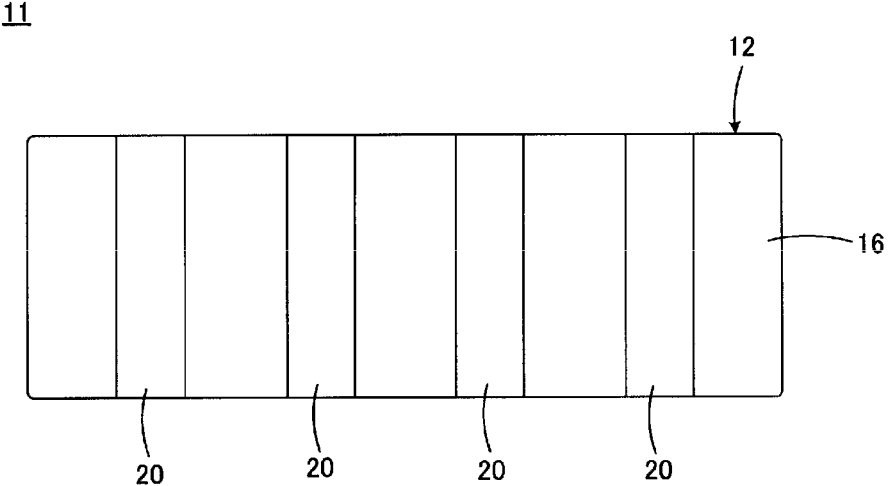
FIG. 7 is a side view of the ceramic body in a state after formation of the external terminal electrodes on the exposed areas illustrated in FIG. 4.
Figure 8:
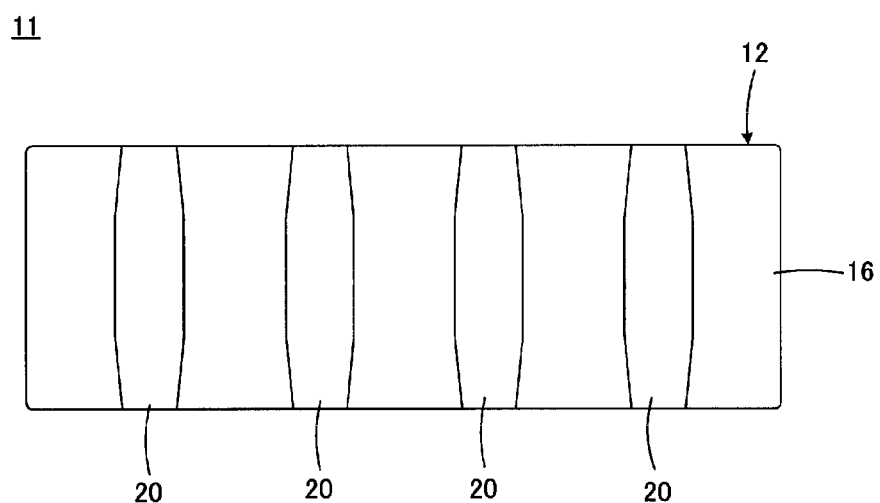
FIG. 8 is a diagram corresponding to FIG. 7, the diagram illustrating a possible modification of the external terminal electrodes.

FIG. 7 and FIG. 8 illustrate the external terminal electrodes 20. Ideally, the external terminal electrodes 20 and 21 have a substantially straight belt-like shape, as illustrated in FIG. 7. However, as illustrated in FIG. 8, the external terminal electrodes 20 and 21 may be narrowed as they approach the principal surfaces 14 and 15.

The base layers of the external terminal electrodes 20 and 21 may be formed of metal, such as Cu, Ni, Ag, Pd, Ag—Pd alloy, or Au, for example.

Upper layer plating films may be disposed on respective surfaces of the base layers of the external terminal electrodes 20 and 21. The upper layer plating films may be formed of metal, such as Cu, Ni, Ag, Pd, Ag—Pd alloy, or Au, for example.

Each base layer and each upper layer plating film are preferably from about 1 µm to about 10 µm, for example, in thickness.

A conductive resin layer for stress relaxation may be provided between the base layer and the upper layer plating film.

Next, a method for manufacturing the multilayer ceramic electronic component 11 will be described.

First, ceramic green sheets to be formed into the ceramic layers 13 and a conductive paste for the internal conductors 23 are prepared. The ceramic green sheets and the conductive paste contain a binder and a solvent. A known organic binder and a known organic solvent can be used as the binder and the solvent.

Next, the conductive paste is printed in predetermined patterns on the ceramic green sheets, for example, by screen printing. Thus, internal conductor patterns to be formed into the internal conductors 23 are produced.

Next, a predetermined number of ceramic green sheets for outer layers, the ceramic green sheets having no internal conductor patterns printed thereon, are stacked. On the ceramic green sheets stacked, a predetermined number of ceramic green sheets on which internal conductor patterns to be formed into the end dummy internal conductors 25 and 26 are printed, a predetermined number of ceramic green sheets on which internal conductor patterns to be formed into the center internal conductors 24 are printed, and a predetermined number of ceramic green sheets on which internal conductor patterns to be formed into the end dummy internal conductors 25 and 26 are printed, are stacked sequentially. On the ceramic green sheets thus stacked, a predetermined number of ceramic green sheets for outer layers are further stacked. Thus, a mother multilayer body is obtained.

Next, the mother multilayer body is pressed in the stacking direction by a hydrostatic press or the like.

Next, the mother multilayer body is cut to a predetermined size to obtain a raw ceramic body.

Next, the raw ceramic body is baked. The baking temperature may vary depending on the ceramic material contained in the ceramic green sheets and the metal material contained in the internal conductor patterns. However, the baking temperature is preferably from about 900° C. to about 1300° C.

Next, a polishing process, such as barrel polishing, is performed on the ceramic body 12 obtained by baking the raw ceramic body. Thus, the ridges and corners of the ceramic body are rounded. During the polishing process, fine pieces of metal are scattered from the exposed portions 22 of the internal conductors 23 and adhere onto the side surfaces 16 and 17 of the ceramic body 12. Since, in particular, the outer layer portions of the ceramic body 12 are removed to a greater degree, a larger amount of metal tends to be scattered near the outer layers of the ceramic body 12. However, since the area ratio of the exposed portions 22 in the exposed area end section 33a is smaller than that of the exposed portions 22 in the exposed area center section 33b, the amount of scattered metal in the exposed area end section 33a can be relatively reduced.

Next, the base layers of the external terminal electrodes 20 and 21 are formed by direct plating on the side surfaces 16 and 17 of the ceramic body 12. The plating may be either electrolytic plating or electroless plating. As described above, the amount of scattered metal in the exposed area end section 33a is relatively reduced. Therefore, in this plating process, even if plating films grow around scattered pieces of metal, the external terminal electrodes 20 and 21 formed of the plating films can be prevented from being partially widened near the outer layers of the ceramic body 12.

Next, upper layer plating films may be provided as necessary.

The multilayer ceramic electronic component 11 can thus be obtained.

Hereinafter, other preferred embodiments of the present invention will be described. In the drawings to be referred to in describing other preferred embodiments of the present invention, elements corresponding to those illustrated in FIGS. 1 to FIG. 8 are given the same reference numerals and will not be described here.

Figure 9:
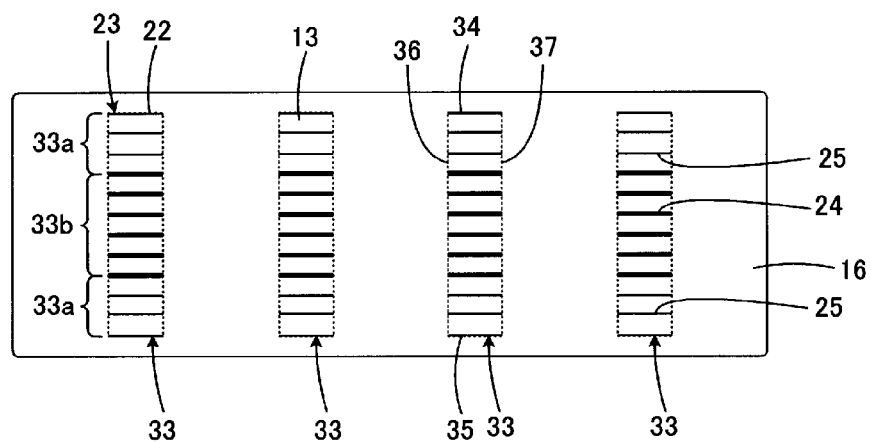
FIG. 9 is a diagram illustrating a second preferred embodiment of the present invention, the diagram corresponding to FIG. 4.

In a second preferred embodiment of the present invention, as illustrated in FIG. 9, to make the area ratio of the exposed portions 22 in the exposed area end section 33a smaller than that of the exposed portions 22 in the exposed area center section 33b, the thickness of each of the exposed portions 22 of the internal conductors 23 in the exposed area end section 33a is made smaller than that of each of the exposed portions 22 of the internal conductors 23 in the exposed area center section 33b.

Figure 10:
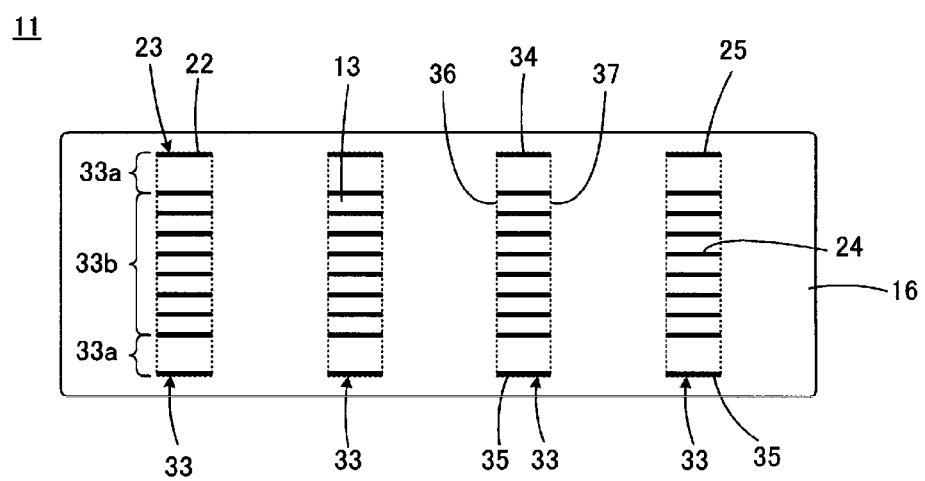
FIG. 10 is a diagram illustrating a third preferred embodiment of the present invention, the diagram corresponding to FIG. 4.

In a third preferred embodiment of the present invention, as illustrated in FIG. 10, to make the area ratio of the exposed portions 22 in the exposed area end section 33a smaller than that of the exposed portions 22 in the exposed area center section 33b, the distance between adjacent exposed portions 22 of the internal conductors 23 in the exposed area end section 33a is made larger than that between adjacent exposed portions 22 of the internal conductors 23 in the exposed area center section 33b.

Figure 11A:
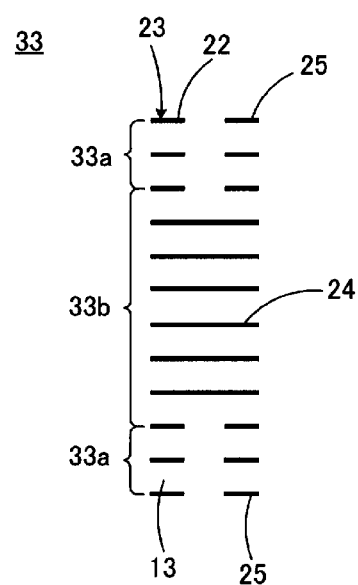
FIGS. 11A and FIG. 11B are diagrams illustrating a fourth preferred embodiment of the present invention, FIG. 11A being a side view of exposed portions of a plurality of internal conductors, and FIG. 11B being a plan view of an end dummy internal conductor located in an exposed area end section.
Figure 11B:
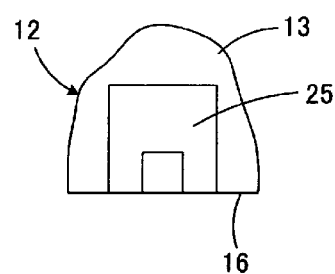

In a fourth preferred embodiment of the present invention, as illustrated in FIG. 11A, to make the area ratio of the exposed portions 22 in the exposed area end section 33a smaller than that of the exposed portions 22 in the exposed area center section 33b, the exposed portions 22 of the internal conductors 23 in the exposed area end section 33a are divided into two parts. Thus, the width of the exposed portions 22 of the internal conductors 23 in the exposed area end section 33a are smaller than that of the exposed portions 22 of the internal conductors 23 in the exposed area center section 33b. As illustrated in FIG. 11B, this configuration can be realized by dividing an extended portion of the end dummy internal conductor 25 into two parts.

Figure 12:
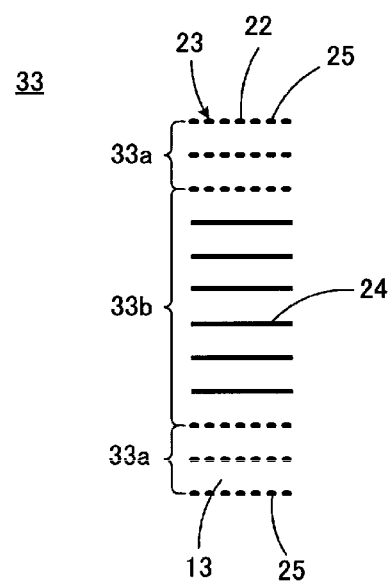
FIG. 12 is a side view illustrating a fifth preferred embodiment of the present invention, the side view illustrating exposed portions of a plurality of internal conductors.

In a fifth preferred embodiment of the present invention, as illustrated in FIG. 12, to make the area ratio of the exposed portions 22 in the exposed area end section 33a smaller than that of the exposed portions 22 in the exposed area center section 33b, the continuity of the exposed portions 22 of the internal conductors 23 in the exposed area end section 33a is made lower than that of the exposed portions 22 of the internal conductors 23 in the exposed area center section 33b. Thus, the width of the exposed portions 22 in the exposed area end section 33a is smaller than that of the exposed portions 22 in the exposed area center section 33b. This configuration can be realized, for example, when a conductive paste having a high degree of shrinkage is selected for forming the end dummy internal conductors 25, because the end dummy internal conductors 25 made of such conductive paste retract to the inside of the ceramic body 12 more easily as compared to the center internal conductors 24.

Figure 13A:
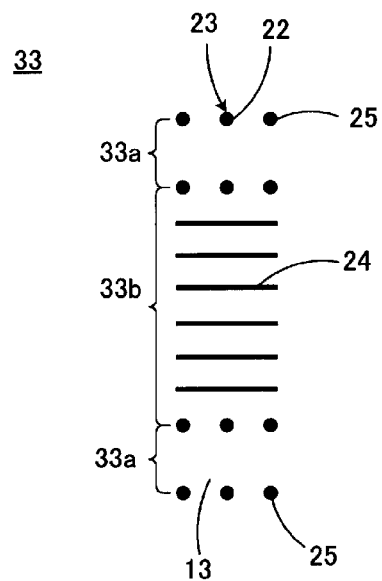
FIGS. 13A and FIG. 13B are diagrams illustrating a sixth preferred embodiment of the present invention, FIG. 13A being a side view of exposed portions of a plurality of internal conductors, and FIG. 13B being a plan view of an end dummy internal conductor located in an exposed area end section.
Figure 13B:
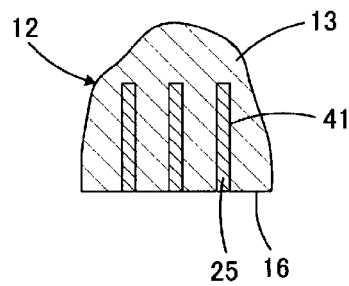

In a sixth preferred embodiment of the present invention, as illustrated in FIG. 13A, the exposed portions 22 each having a substantially circular shape are scattered in the exposed area end section 33a. Thus, the area ratio of the exposed portions 22 in the exposed area end section 33a is smaller than that of the exposed portions 22 in the exposed area center section 33b. As illustrated in FIG. 13B, this configuration can be realized, for example, by forming half-through vias 41 by irradiating the side surface 16 of the ceramic body 12 with laser light, filling the half-through vias 41 with conductive paste, and then carrying out baking.

Figure 14:
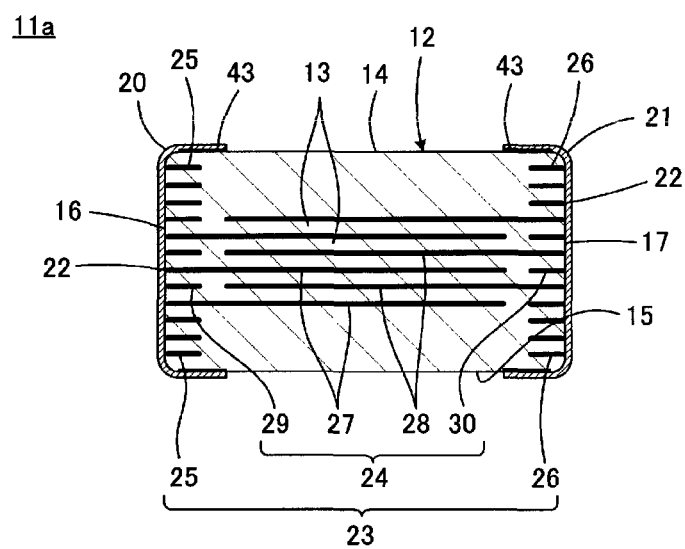
FIG. 14 is a diagram illustrating a seventh preferred embodiment of the present invention, the diagram corresponding to FIG. 2.

As illustrated in FIG. 14, in a multilayer ceramic electronic component 11a according to a seventh preferred embodiment of the present invention, substantially square surface conductors 43 are formed on the principal surfaces 14 and 15 of the ceramic body 12. This allows the external terminal electrodes 20 and 21 formed by direct plating to easily reach the sides of the principal surfaces 14 and 15.

As illustrated in FIGS. 15A and FIG. 15B, a ceramic body 12a of a multilayer ceramic electronic component according to an eighth preferred embodiment of the present invention has a configuration in which an effective internal conductor 50 and an effective internal conductor 56 are disposed opposite each other. The effective internal conductor 50 has one facing portion 45 and four extended portions 46 to 49, and the effective internal conductor 56 has one facing portion 51 and four extended portions 52 to 55. A multilayer ceramic capacitor including the effective internal conductors 50 and 56 described above can be used as a low equivalent series inductance (ESL) capacitor.

Figure 16A:
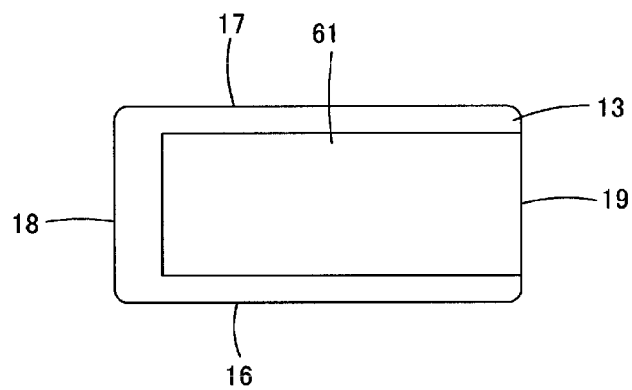
FIGS. 16A and FIG. 16B are diagrams illustrating a ninth preferred embodiment of the present invention, the diagrams corresponding to some of FIG. 3A to FIG. 3F.
Figure 16B:
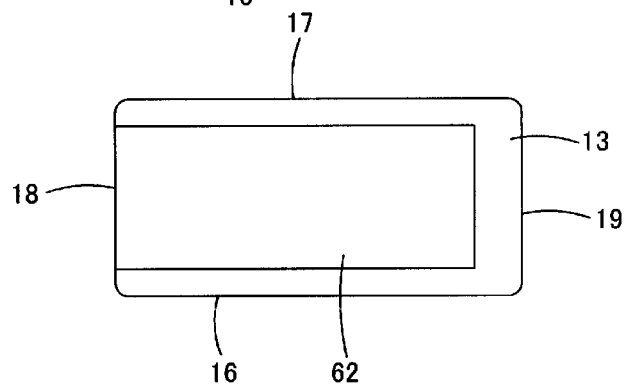
Figure 17A:
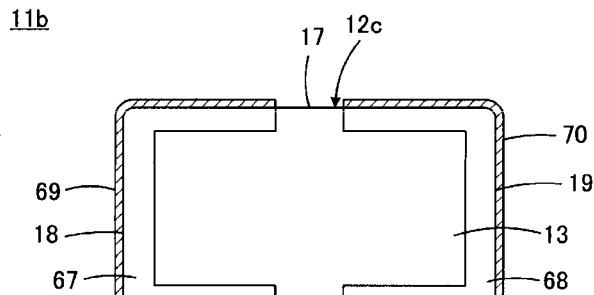
FIGS. 17A to FIG. 17D are diagrams illustrating a tenth preferred embodiment of the present invention, the diagrams corresponding to some of FIG. 3A to FIG. 3F and illustrating a ceramic body in a state after formation of external terminal electrodes.
Figure 17B:
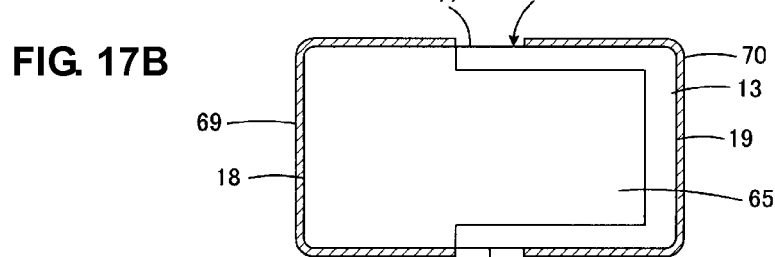
Figure 17C:
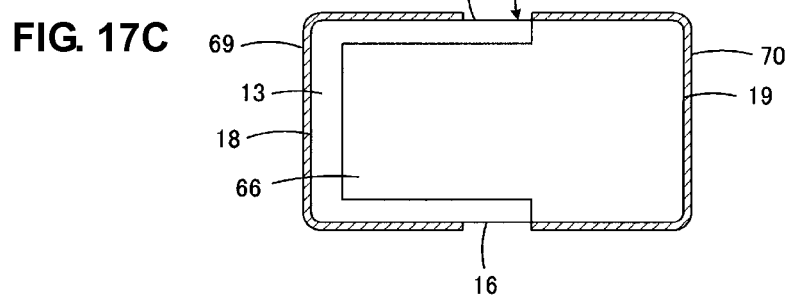
Figure 17D:
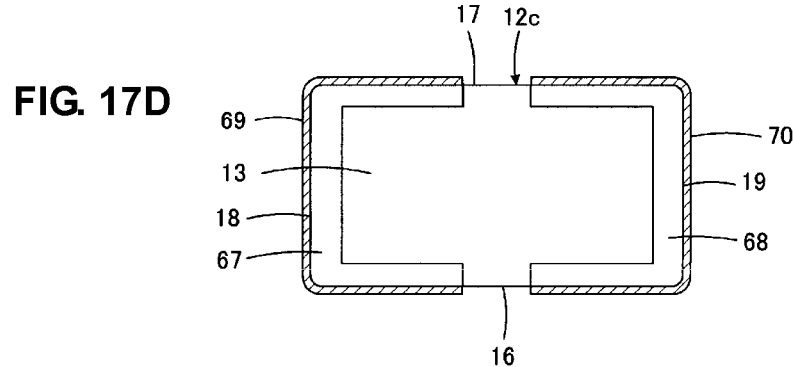
Figure 18:
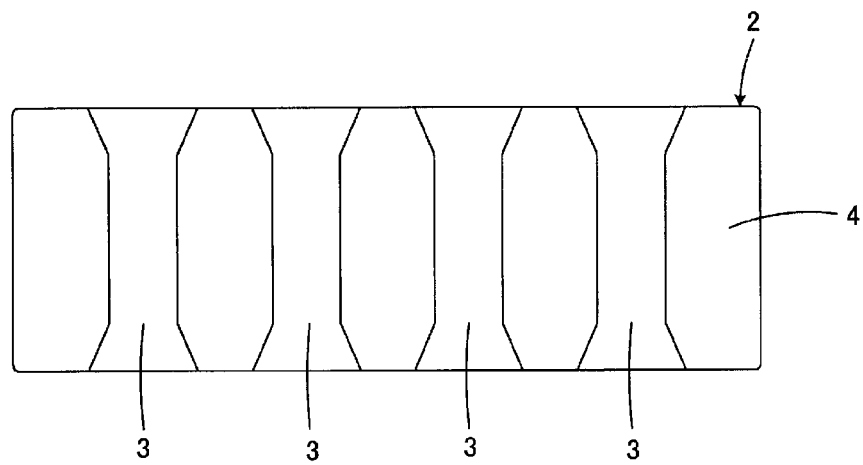
FIG. 18 is a side view of a ceramic body provided with external terminal electrodes having an undesired shape, the side view illustrating a problem to be solved by the present invention.

A multilayer ceramic electronic component according to a ninth preferred embodiment of the present invention is of two-terminal type. As illustrated in FIGS. 16A and 16B, a ceramic body 12b included in this multilayer ceramic electronic component includes a pair of internal conductors 61 and 62 formed therein. The internal conductors 61 and 62 are configured to be exposed to the shorter side surfaces 19 and 18, respectively. The ninth preferred embodiment clearly demonstrates that the present invention is also applicable to two-terminal multilayer ceramic electronic components. Unlike in the case of multilayer ceramic electronic components of multi-terminal type, solder bridging will not often occur in two-terminal multilayer ceramic electronic components. With this two-terminal type, the appearance of external terminal electrodes can be effectively prevented from deteriorating due to, for example, the reduced area of center portions of the external terminal electrodes resulting from the increased area of the external terminal electrodes extending to the principal surfaces.

As illustrated in FIGS. 17A to FIG. 17D, in a multilayer ceramic electronic component 11b according to a tenth preferred embodiment of the present invention, each of exposed portions of effective internal conductors 65 and 66 and dummy internal conductors 67 and 68 is exposed along three of the four side surfaces 16 to 19 of a ceramic body 12c. Accordingly, each of external terminal electrodes 69 and 70 is also formed along three of the four side surfaces 16 to 19 of the ceramic body 12c. Thus, a gap between the external terminal electrodes 69 and 70 is reduced.

When a gap between the external terminal electrodes 69 and 70 is designed to be small, solder bridging may occur as in the case of multilayer ceramic electronic components of multi-terminal type. An effective way of preventing this is to make the area ratio of exposed portions in an end section of an exposed area smaller than that of exposed portions in a center section of the exposed area. This can be realized, for example, by making the thickness of each of the dummy internal conductors 67 and 68 smaller than that of each of the effective internal conductors 65 and 66.

Experiments carried out to verify the effects and advantages of various preferred embodiments of the present invention will now be described.

On the basis of the design of the first preferred embodiment, an array-type multilayer ceramic capacitor serving as a multilayer ceramic electronic component was prepared.

First, ceramic green sheets were obtained by molding and drying ceramic slurry containing BaTiO$_3$ ceramic powder. Next, Ni paste was printed on the ceramic green sheets by screen printing to form predetermined internal conductor patterns.

Next, a mother multilayer body was obtained by stacking the ceramic green sheets. Then, a raw ceramic body was cut from the mother multilayer body and baked at a maximum temperature of about 1200° C. for about 2 hours.

Next, a barrel polishing process was performed on the resulting ceramic body.

Next, under the conditions described below, electrolytic barrel plating was performed on the polished ceramic body. Thus, Cu plating films were formed on end surfaces of the ceramic body. In the Cu plating process, horizontal barreling was performed at a rotation speed of about 20 rpm. The Cu plating was performed in two steps, a strike plating step and a thick plating step.

The conditions of the strike Cu plating were those shown in Table 1 below.

TABLE 1

| Plating bath | Copper pyrophosphate | 14 g/liter |
|---|---|---|
| | Pyrophosphoric acid | 120 g/liter |
| | Dipotassium oxalate | 10 g/liter |
| | pH | 8.5 |
| | Bath temperature | 25° C. |
| Current density | | 0.1 A/dm$^2$ |
| Time | | 120 minutes |

The conditions of the thick Cu plating were those shown in Table 2 below.

TABLE 2

| Plating bath | Bath for process of Pyrobright manufactured by C. Uyemura & Co., Ltd. | |
|---|---|---|
| | pH | 8.8 |
| | Bath temperature | 55° C. |
| Current density | | 0.3 A/dm$^2$ |
| Time | | 120 minutes |

Thus, array-type multilayer ceramic capacitors of samples 1 to 13, the capacitors each including about 4 elements having dimensions of about 2.0 mm by about 1.05 mm by about 0.85 mm, were prepared.

In each sample, an exposed area center section and an exposed area end section were defined in accordance with the method described with reference to FIG. 6. Before plating, as shown in Table 3 below, the width of each exposed portion, the thickness of each exposed portion, and the distance between exposed portions were measured for each of the exposed area center section and the exposed area center section defined by the method described above.

Additionally, the area ratio of the exposed portions in the exposed area center section and the area ratio of the exposed portions in the exposed area end section were determined as follows.

That is, scanning electron microscopy/energy dispersive X-ray analysis (SEM/EDX) was used to analyze the ratio of "Ni peak intensity" to "Ba peak intensity" (Ni peak intensity/Ba peak intensity) in the exposed area. The ratio of "Ni peak intensity" to "Ba peak intensity" was defined as the area ratio of the exposed portions. The analysis conditions were an acceleration voltage of about 20 kV and a field of view of about 2000 times. Depending on the magnification, if an image of only part of the exposed area was able to be obtained, the measurement was performed multiple times to combine the resulting images. For convenience, about five multilayer ceramic capacitors for each sample were subjected to measurement and their average values were calculated.

Then, from the measured area ratios, the ratio of the area ratio of the exposed portions in the exposed area end section to that of the exposed portions in the exposed area center section (end section/center section) was calculated.

Table 3 shows the calculated ratio of the area ratios for each sample.

Additionally, after plating, evaluations were made as to whether there were occurrences of poor appearance and solder bridging, as shown in Table 3.

Specifically, the occurrence of poor appearance was evaluated in the following manner. The width of any one of external terminal electrodes was measured at three points by observation with a microscope, the three points being an uppermost side, a center portion, and a lowermost side of the external terminal electrode. An average of the measured widths was calculated. Then, a plated base layer having a width of about 200 μm or more at its widest portion was determined to have a poor appearance. About 100 multilayer ceramic capacitors for each sample were subjected to observation. If any one of them was found to be defective, the sample was determined to be "NG".

For evaluating the occurrence of solder bridging, about eight substantially square lands were formed on a glass epoxy substrate. Then, about 1000 multilayer ceramic capacitors for each sample were soldered onto the lands and checked for occurrence of solder bridging. If any one of them was found to be defective, the sample was determined to be "NG".

TABLE 3

| | Exposed area center section | | | Exposed area end section | | | | | |
|---|---|---|---|---|---|---|---|---|---|
| | Width of exposed portion (μm) | Thickness of exposed portion (μm) | Distance between exposed portions (μm) | Width of exposed portion (μm) | Thickness of exposed portion (μm) | Distance between exposed portions (μm) | Ratio of area ratios (end section/center section) | Poor appearance | Solder bridging |
| *Sample 1 | 120 | 1.2 | 3.0 | 150 | 1.2 | 3.0 | 1.35 | NG | |
| *Sample 2 | 120 | 1.2 | 3.0 | 120 | 1.2 | 3.0 | 1.00 | NG | |
| Sample 3 | 120 | 1.2 | 3.0 | 110 | 1.2 | 3.0 | 0.89 | | |
| Sample 4 | 120 | 1.2 | 3.0 | 80 | 1.2 | 3.0 | 0.59 | | |
| Sample 5 | 120 | 1.2 | 3.0 | 50 | 1.2 | 3.0 | 0.34 | | |
| *Sample 6 | 120 | 1.2 | 3.0 | 120 | 1.4 | 3.0 | 1.17 | NG | |
| Sample 7 | 120 | 1.2 | 3.0 | 120 | 1.0 | 3.0 | 0.83 | | |
| Sample 8 | 120 | 1.2 | 3.0 | 120 | 0.7 | 3.0 | 0.58 | | |
| Sample 9 | 120 | 1.2 | 3.0 | 120 | 0.5 | 3.0 | 0.42 | | |
| Sample 10 | 120 | 1.2 | 3.0 | 120 | 0.3 | 3.0 | 0.25 | | |
| Sample 11 | 120 | 1.2 | 3.0 | 120 | 1.2 | 5.0 | 0.60 | | |
| *Sample 12 | 120 | 1.2 | 3.0 | 120 | 1.2 | 1.0 | 3.00 | NG | NG |
| *Sample 13 | 120 | 1.2 | 3.0 | 120 | 1.2 | 0.5 | 6.00 | NG | NG |

In Table 3, a sample whose ratio of area ratios (end section/center section) described above was about one or more, that is, a sample which was outside the scope of the present invention is given an asterisk (*).

Table 3 shows that if the ratio of area ratios (end section/center section) is less than about one, poor appearance and solder bridging do not occur.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:
1. A multilayer ceramic electronic component comprising:
a ceramic body including a stack of ceramic layers, the ceramic body including two principal surfaces opposite each other and four side surfaces connecting the two principal surfaces, and the ceramic body being rounded at corners and ridges between adjacent ones of the principal surfaces and side surfaces;
a plurality of internal conductors disposed inside the ceramic body, the internal conductors each including an exposed portion exposed to at least one of the side surfaces; and
a plurality of external terminal electrodes directly plated on the side surfaces such that the external terminal electrodes are electrically connected to the internal conductors; wherein
the exposed portions of the respective internal conductors are exposed adjacently in a stacking direction of the ceramic layers, and define an exposed area having an upper side of the uppermost exposed portion as an upper limit and a lower side of the lowermost exposed portion as a lower limit;
in the stacking direction of the ceramic layers, an area ratio of the exposed portions in an end section of the exposed area is smaller than that of the exposed portions in a center section of the exposed area;
the plurality of internal conductors includes:
  center internal conductors disposed in a center of the ceramic body in the stacking direction of the ceramic layers, and including effective internal conductors substantially contributing to exhibited electrical characteristics, and
  end dummy internal conductors disposed at ends of the ceramic body in the stacking direction of the ceramic layers, not positioned at the same heights as those of the effective internal conductors, and substantially not contributing to exhibited electrical characteristics;
the exposed portions of the respective center internal conductors are exposed adjacently in the stacking direction of the ceramic layers, and a section having an upper side of the uppermost exposed portion as an upper limit and a lower side of the lowermost exposed portion as a lower limit is defined as the center section of the exposed area;
the exposed portions of the respective end dummy internal conductors are exposed adjacently in the stacking direction of the ceramic layers, and each of sections having an upper side of the uppermost exposed portion as an upper limit and a lower side of the lowermost exposed portion as a lower limit is defined as the end section of the exposed area; and
each of the center internal conductors includes a facing portion arranged to face the facing portion of another one of the center internal conductors and an extended portion extending from the facing portion;

the facing portion and the extended portion of each of the center internal conductors have the substantially the same thickness;

a width of the exposed portions of the internal conductors in the end section of the exposed area is smaller than a width of the exposed portions of the internal conductors in the center section of the exposed area;

each of the exposed portions of each of the internal conductors includes two end portions disposed at opposite ends of the exposed portions in a width direction thereof; and both of the end portions of each of the internal conductors in the end section of the exposed area are disposed inwardly in the width direction of both of the end portions of each of the internal conductors in the center section of the exposed area.

2. The multilayer ceramic electronic component according to claim 1, wherein when a distance between the upper limit and the lower limit of the exposed area is denoted by D, each of sections that are within about 0.15 D from the respective principal surfaces is defined as the end section of the exposed area and the remaining section is defined as the center section of the exposed area.

3. A multilayer ceramic electronic component comprising:
a ceramic body including a stack of ceramic layers, the ceramic body including two principal surfaces opposite each other and four side surfaces connecting the two principal surfaces, and the ceramic body being rounded at corners and ridges between adjacent ones of the principal surfaces and side surfaces;

a plurality of internal conductors disposed inside the ceramic body, the internal conductors each including an exposed portion exposed to at least one of the side surfaces; and a plurality of external terminal electrodes directly plated on the side surfaces such that the external terminal electrodes are electrically connected to the internal conductors; wherein the exposed portions of the respective internal conductors are exposed adjacently in a stacking direction of the ceramic layers, and define an exposed area having an upper side of the uppermost exposed portion as an upper limit and a lower side of the lowermost exposed portion as a lower limit;

in the stacking direction of the ceramic layers, an area ratio of the exposed portions in an end section of the exposed area is smaller than that of the exposed portions in a center section of the exposed area;

the plurality of internal conductors includes:

center internal conductors disposed in a center of the ceramic body in the stacking direction of the ceramic layers, and including effective internal conductors substantially contributing to exhibited electrical characteristics, and end dummy internal conductors disposed at ends of the ceramic body in the stacking direction of the ceramic layers, not positioned at the same heights as those of the effective internal conductors, and substantially not contributing to exhibited electrical characteristics;

the exposed portions of the respective center internal conductors are exposed adjacently in the stacking direction of the ceramic layers, and a section having an upper side of the uppermost exposed portion as an upper limit and a lower side of the lowermost exposed portion as a lower limit is defined as the center section of the exposed area;

the exposed portions of the respective end dummy internal conductors are exposed adjacently in the stacking direction of the ceramic layers, and each of sections having an upper side of the uppermost exposed portion as an upper limit and a lower side of the lowermost exposed portion as a lower limit is defined as the end section of the exposed area;

each of the center internal conductors is substantially flat so as to have a substantially constant thickness at all portions thereof;

a width of the exposed portions of the internal conductors in the end section of the exposed area is smaller than a width of the exposed portions of the internal conductors in the center section of the exposed area;

each of the exposed portions of each of the internal conductors includes two end portions disposed at opposite ends of the exposed portions in a width direction thereof; and both of the end portions of each of the internal conductors in the end section of the exposed area are disposed inwardly in the width direction of both of the end portions of each of the internal conductors in the center section of the exposed area.

4. The multilayer ceramic electronic component according to claim 3, wherein when a distance between the upper limit and the lower limit of the exposed area is denoted by D, each of sections that are within about 0.15 D from the respective principal surfaces is defined as the end section of the exposed area and the remaining section is defined as the center section of the exposed area.

* * * * *